J. A. PILCHER.
CENTER PLATES FOR RAILWAY CARS.
APPLICATION FILED JUNE 5, 1913.
1,090,168.
Patented Mar. 17, 1914.
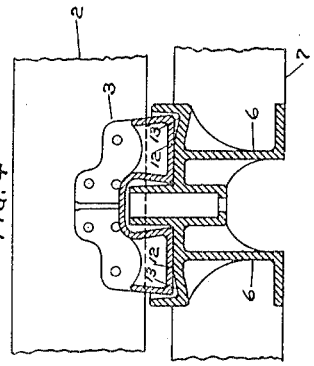
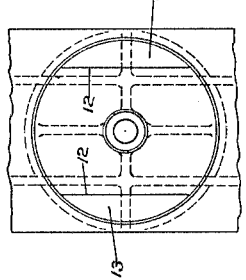
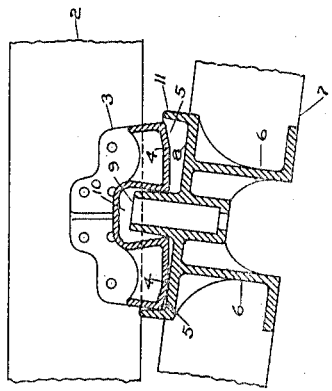
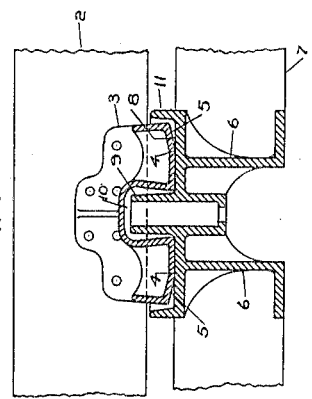
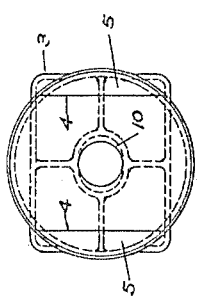
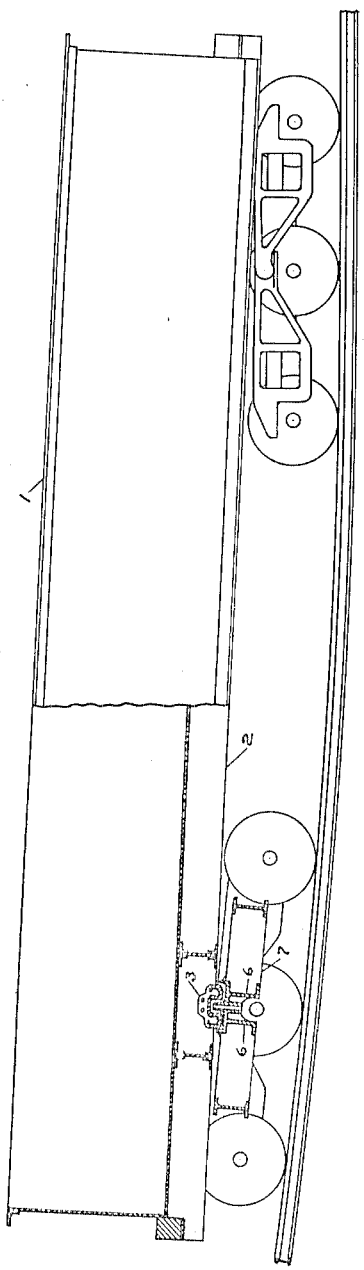
Witnesses
Robt. K. Temple
G. Maslin Davis
Inventor
John A. Pilcher.

UNITED STATES PATENT OFFICE.

JOHN A. PILCHER, OF ROANOKE, VIRGINIA.

CENTER-PLATES FOR RAILWAY-CARS.

1,090,168.  Specification of Letters Patent.  Patented Mar. 17, 1914.

Application filed June 5, 1913. Serial No. 771,930.

*To all whom it may concern:*

Be it known that I, JOHN A. PILCHER, a citizen of the United States, residing at Roanoke, in the county of Roanoke and State of Virginia, have invented certain new and useful Improvements in Center-Plates for Railway-Cars, of which the following is a specification.

The object of this invention is to overcome the difficulties that are now encountered in the passage of railway cars over vertical curves in the track.

As is well known, when a car having flat center plates is traveling over such a curve, it is necessary that the center plates adjust themselves to this change of conditions. This is now ordinarily taken care of by one of two methods or by a combination of them. First, there may be enough deflection of the truck springs to take up the angularity, in which case the top and bottom center plates remain in their normal relative positions. Second, one of the center plates may be tilted about the other. Or, a combination of the two conditions may result.

For passenger equipment cars where there is a considerable amount of deflection in the springs between the truck bolster and the equalizer bars no serious results have ordinarily been experienced, but in order to keep the wheel loads more readily constant, ball shaped center plates are employed. For freight equipment, however, spherical shaped center plates have been found undesirable because, unless the side bearings are kept neatly adjusted, the car body will rock excessively laterally, and when one side of the car body is down on the corresponding side bearing of the truck the weight of the car body exerts no tendency to return the body to its normal position on the center plates as is the case with flat center plates, also, with spherical shaped center plates, there is more liability of the car body leaving the trucks than with flat center plates. For freight cars with ordinary four wheel trucks, the first method mentioned above has heretofore been employed and it has successfully taken care of the irregularity. This is because the truck springs even though having very limited deflection before they become solid, are regularly placed either on or near the vertical center line of the truck, longitudinally of the car, at which point a very small deflection will permit the angularity of the bolster on the springs. But in six wheel trucks for freight service such as shown and described in the patent to William H. Lewis and John A. Pilcher, No. 1054697, March 4, 1913, the matter of the rocking between the top and bottom center plates in passing over a vertical curve becomes a necessity, because in a truck of this or similar types the deflection of the springs is limited and in addition the springs are located at considerable distance out from the center plate. Hence to correct a small angularity between the center plates demands an amount of deflection of the bolster springs that can not be secured in ordinary construction. The result is that the one center plate is actually tilted about the other, throwing the point of contact to one side of the center plate. This in turn causes excessive changes in the wheel and spring loadings that are liable to cause the failure of the parts so overloaded. These conditions are all the more marked in trucks for heavier capacity cars which require a center plate of larger diameter and area.

To the end that these difficulties may be overcome, my invention consists of the formation of parts as hereinafter described and finally claimed.

In the drawing, Figure 1 represents in longitudinal sectional view the center plates of my invention in which the top center plate rests on the bottom one in its normal position. Fig. 2 is a similar view in which the bottom plate is tilted as in passing over a vertical curve. Fig. 3 is an inverted plan view of the top center plate as shown in Figs. 1 and 2. Fig. 4 is a longitudinal sectional view of a modified form of my invention and Fig. 5 a plan view of the bottom center plate of the same. Fig. 6 is a side elevation, partly in section, of a car on a vertical curve in the track, in which the center plates of Figs. 1, 2, and 3 are shown in their relative positions for such a condition of track.

Referring to the drawings in which like parts are given the same reference numbers wherever they occur, 1 represents a car having center sills 2. To the center sills is secured in any substantial manner the top center plate 3. This top center plate 3. as shown in Figs. 1, 2, and 3 is of the circular, flat bottom type, except that at each end at 4 I cut the horizontal portion away on an upwardly inclined plane 5 so that when one of the two plates rocks on the other longitudinally of the car it will be at the intersection of the two planes, at 4, instead of at the extreme outer edge as in ordinary circular, flat bottom center plates. This plane 5, while shown and described as being upwardly inclined from the point 4, might in reality be a vertical plane at right angles to the horizontal bottom at 4, or in fact at any angle that will give a line of contact across the other center plate, transversely of the car. In addition to more nearly equalizing the wheel and spring loads in the trucks, this construction will concentrate the center plate load at the line 4, extending transversely of the car, from which it can be much more readily transferred to the transverse members 6 of the truck bolster 7 than if it were concentrated at substantially a point near the extreme outer edge of the bottom center plate 8 as would be the case were a complete, circular, top plate rocked on a flat bottom one, the rocking of the complete circular plate on the other being the same as tilting a coin on a flat surface. The projection 9 on the bottom center plate 8 and the pocket 10 in the top center plate 3 may be of any of the customary designs, their purpose being to provide means for preventing the car from readily leaving the trucks. At 11 is also provided a vertical flange extending for the full circumference about the bottom center plate. This flange 11 also aids in keeping the two center plates together and in addition forms means for retaining grease or other lubricant between the two plates.

Transversely of the car the two center plates are formed identically as flat center plates, so that there will be no excessive rocking on the side bearings and the weight of the car body will tend to return the body to its normal position on the center plates.

In Figs. 4 and 5 I show a modified form of my invention in which the top center plate is made flat for its entire area, the bottom plate being cut away at each end at 12 on downwardly inclined planes 13, the mechanical results being identical with those obtained in the device as shown in Figs. 1, 2 and 3.

Another form of construction not shown in the drawing would be to cut back both the top and bottom center plates, but while this would keep the point of application of the load back near the truck center, yet it would give substantially a point contact in cases where a vertical curve occurs on a horizontal curve in the track, and in this way it would not correct that difficulty of the present form of construction.

Having thus described my invention, what I claim is:

1. The combination with a car of a circular, flat faced center plate having a segmental portion of the flat face cut away at the ends, longitudinally of the car, substantially as described.

2. The combination with a car of a circular, flat faced center plate having a segmental portion of the flat face cut away at the ends, longitudinally of the car, along an inclined plane at an acute angle with the plane of the flat bottom, substantially as described.

3. The combination with a car of a circular, flat bottom top center plate having a segmental portion of the flat bottom cut away at the ends, longitudinally of the car, along an inclined plane at an acute angle with the plane of the said flat bottom, and a circular lower center plate having a flat top face adapted to support the said top center plate, substantially as described.

In testimony whereof I affix my signature in presence of two witnesses.

JOHN A. PILCHER.

Witnesses:
B. W. WELLS,
ROY K. BROWN.